(12) United States Patent
Mikulski et al.

(10) Patent No.: US 9,602,288 B1
(45) Date of Patent: Mar. 21, 2017

(54) ENHANCED DATA SECURITY THROUGH UNIQUENESS CHECKING

(71) Applicant: Amazon Technologies, Inc., Seattle, WA (US)

(72) Inventors: Andrew Paul Mikulski, Seattle, WA (US); Gregory Branchek Roth, Seattle, WA (US); Matthew John Campagna, Bainbridge Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/672,029

(22) Filed: Mar. 27, 2015

(51) Int. Cl.
*H04L 9/32* (2006.01)
*G06F 21/57* (2013.01)

(52) U.S. Cl.
CPC .......... *H04L 9/3247* (2013.01); *G06F 21/577* (2013.01); *H04L 9/3252* (2013.01)

(58) Field of Classification Search
CPC .... H04L 9/3247; H04L 9/3252; G06F 21/577
USPC .......................................................... 713/176
See application file for complete search history.

(56) References Cited

U.S. PATENT DOCUMENTS

| | | | | |
|---|---|---|---|---|
| 2006/0159269 A1* | 7/2006 | Braun | ........... | H04L 9/0833 380/277 |
| 2008/0306885 A1* | 12/2008 | Cordery | ........... | G07B 17/00733 705/410 |
| 2012/0209822 A1* | 8/2012 | Prabhakar | ........... | G06F 17/30371 707/703 |
| 2014/0163964 A1* | 6/2014 | Chen | ........... | G06F 17/27 704/9 |
| 2014/0164776 A1* | 6/2014 | Hook | ........... | H04L 9/14 713/171 |
| 2014/0219448 A1* | 8/2014 | Froels | ........... | H04L 9/14 380/255 |

OTHER PUBLICATIONS

"Digital Signature Standard (DSS)," Federal Information Processing Standards Publication 186-4, National Institute of Standards and Technology, Gaithersburg, Maryland, Jul. 2013, 130 pages.
"X9.62-1998, Public Key Cryptography for the Financial Services Industry: The Elliptic Curve Digital Signature Algorithm (ECDSA) ©," American National Standards Institute, American Bankers Association, Washington, DC, Sep. 20, 1998, 128 pages.

* cited by examiner

*Primary Examiner* — Mohammed Waliullah
(74) *Attorney, Agent, or Firm* — Davis Wright Tremaine LLP

(57) ABSTRACT

A system records use of values used in cryptographic algorithms where the values are subject to uniqueness constraints. As new values are received, the system checks whether violations of a unique constraint has occurred. If a violation occurs, the system performs actions to mitigate potential compromise caused by exploitation of a vulnerability caused by violation of the uniqueness constraint.

24 Claims, 9 Drawing Sheets

ENHANCED DATA SECURITY THROUGH UNIQUENESS CHECKING

BACKGROUND

Many techniques have been developed to enhance data security. Cryptographic algorithms, for example, can be used to keep data confidential and to authenticate that data purported as being from a particular source is, in fact, from that source. Such algorithms typically employ techniques that make circumvention (e.g., unauthorized decryption or impersonation) computationally infeasible. However, for cryptographic algorithms to be secure, they must be implemented correctly. Incorrect implementation can, in some instances, create vulnerabilities that can be exploited. Further, secure cryptographic algorithms can be very complex and the requirements for correct implementation can be complicated. Further, because of the level at which cryptographic algorithms are used, incorrect implementations and other issues can often go unnoticed.

BRIEF DESCRIPTION OF THE DRAWINGS

Various embodiments in accordance with the present disclosure will be described with reference to the drawings, in which.

DETAILED DESCRIPTION

Figure 1:
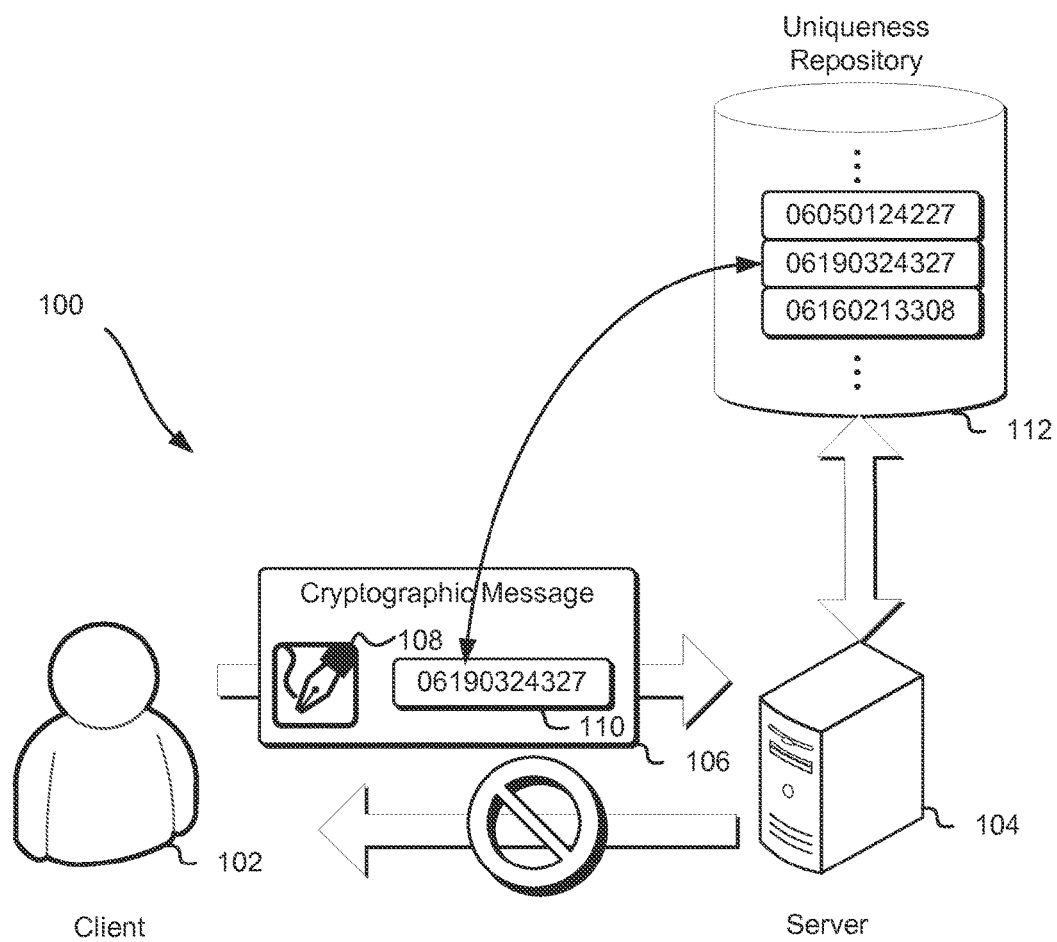
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the enhancement of data and other security in systems that utilize cryptographic algorithms and, in various embodiments, cryptographic algorithms where security levels are maintained when certain information is used within uniqueness constraints. In one example, a cryptographic algorithm for generating digital signatures utilizes a value that, if used more than once for the same public/private key pair for the generation of digital signatures for different messages, results in degradation of the security of that use that the cryptographic algorithm provides. For instance, the value may be a randomly-generated value used for the generation of a digital signature using the Elliptic Curve Digital Signature Algorithm (ECDSA) or the Digital Signature Algorithm, although the techniques of the present disclosure extend to other cryptographic algorithms and, generally, any cryptographic algorithm performed in accordance with a specification that states one or more uniqueness constraints on a set of values used in performance of the cryptographic algorithm. Values for which specifications of cryptographic algorithms state constraints on uniqueness may be referred to as "uniqueness constrained values." As another example, a uniqueness constraint may specify that the same uniqueness constrained value should not be used with two different public/private key pairs for two digital signatures, regardless of whether the message is the same or different.

In an embodiment, a system logs use of uniqueness constrained values in a manner allowing for checking whether any subsequent use of the uniqueness constrained values violates any applicable uniqueness constraints. In some examples, a system that receives messages with digital signatures verifies, synchronously with processing of the message, whether violations of uniqueness constraints occur. As a result, the manner in which the message is processed varies in accordance with whether any applicable uniqueness constraints have been violated. For instance, if the message encodes a request to perform one or more operations, the request may be denied (or otherwise processed differently) if a digital signature of the message violates the applicable uniqueness constraints.

In other examples, a system logs use of uniqueness constrained values and an asynchronous process determines whether a violation of any uniqueness constraints has occurred. For instance, an asynchronous process may analyze logs to detect entries with duplicate uniqueness constrained values in violation of the constraints. The logs may contain information emitted from multiple servers, which may be from the same or multiple services, which may be operated by the same or by different service providers. Note that, in embodiments where violations of uniqueness constraints are detected asynchronously, messages with digital signatures in violation may be processed as if no violation has occurred and mitigating action (e.g., revocation of a public cryptographic key) may occur after the message processing. For instance, in examples where a message encodes a request and a digital signature of the message is in violation of a uniqueness constraint, if any other additional requirements are fulfilled (e.g., the digital signature is valid and fulfillment of the request is authorized), the request may be fulfilled despite the violation.

FIG. 1 shows an illustrative example of an environment 100 in which various embodiments can be implemented. In the environment 100 a client 102 communicates with a server 104. The client 102 may communicate for instance through a computing device configured to generate and transmit communications over a network that separates the client 102 and the server 104. In some circumstances, operation of the server 104 is dependent on authentication of the client 102. For example, the server 104 may be a component of a system that employs one or more access control mechanisms to exert control over access to resources accessible through the server 104. For instance, resources accessible through the server 104 may have associated permissions and authentication may be required to ensure that the permissions are enforced correctly.

In an embodiment, to authenticate the client 102, the client may transmit a cryptographic message 106 to the server 104. A cryptographic message 106 may be a collection of data that encodes (e.g., in a structured manner) a message and a digital signature of the message. As illustrated in FIG. 1, the cryptographic message 106 includes, in addition to the message, two components: a signature component 108 and a uniqueness constrained value 110. In an embodiment the signature component 108 and uniqueness constrained value 110 collectively form a digital signature for the message. In some implementations the signature component 108 and uniqueness constrained value 110 collectively form a digital signature generated using the ECDSA, such as discussed in the Federal Information Processing Standards Publication (FIPS) 186-4 and in ANSI X9.62, Public Key Cryptography for the Financial Services Industry: The Elliptic Curve Digital Signature Algorithm (ECDSA), 1999, which are incorporated herein by reference. As another example, the signature component 108 and uniqueness constrained value 110 collectively form a digital signature for the digital signature algorithm (DSA), also discussed in FIPS 186-4, and other variations of the ElGamal Signature Scheme.

For instance, referring to ECDSA, a digital signature may comprise the pair (r, s), where the uniqueness constrained value may be r, where $r=x_1 \mod n$, where n is the order of the generator G (i.e., an integer such that $n \times G = 0$, with "×" denoting elliptic curve point multiplication by a scalar) of the elliptic curve used to generate the digital signature, and $x_1$ is the first coordinate of the point $(x_1, y_1)$, which is determined by multiplying k by G (using elliptic curve point multiplication by a scalar), where k is an integer between 1 and (n−1), which may be randomly selected. Note that a "randomly selected" and other phrases are intended to cover random number generation and pseudorandom number generation. Referring to DSA, a digital signature may comprise the pair (r, s), where $r=(g^k \mod p) \mod q$, where k is a value between zero and q, where q is a prime number, p is another prime number, and g is a number whose multiplicative order modulo p is q. Other examples are also considered as being within the scope of the present disclosure.

Generally the uniqueness constrained value 110 is a value generated in accordance with a cryptographic algorithm that imposes a constraint on uniqueness of such values. In the example of ECDSA and DSA for instance, the cryptographic algorithms state that for any different digital signatures the uniqueness constrained values should be unique. Stated another way, for the same public/private key pair the same uniqueness constrained value should not be used more than once for generation of digital signatures for different messages. Note, however, that the scope of the present disclosure is not limited to values required by a cryptographic algorithm to be unique but generally that impose limits on a number of times a value should be used under specified conditions.

The server 104 may be configured to determine whether the uniqueness constrained value 110 in the cryptographic message 106 violates a uniqueness constraint of a cryptographic algorithm used for generation of the digital signature. To do this, in an embodiment, the server 104 has access to a uniqueness repository 112 where the uniqueness repository 112 may be a data store that stores data in a manner enabling the server 104 to check whether uniqueness constrained values violate any uniqueness constraints. Generally the data in the uniqueness repository 112 may be organized such that information from the cryptographic message 106 and/or other contextual information may be used to determine previous use of uniqueness constrained values under conditions for which the values are constrained by the cryptographic algorithm. Note that a cryptographic algorithm may constrain a value directly and/or indirectly. For instance, in the example of ECDSA, specifications of the cryptographic algorithm explicitly (i.e., directly) constrain the value "k," discussed above. However, the value "r," which is a component of a digital signature, is likewise (indirectly) constrained due to "r" being derived from "k." Thus, both "r" and "k" are uniqueness constrained values, and violation of use of one, in this example, indicates a violation of use of the other.

Figure 4:
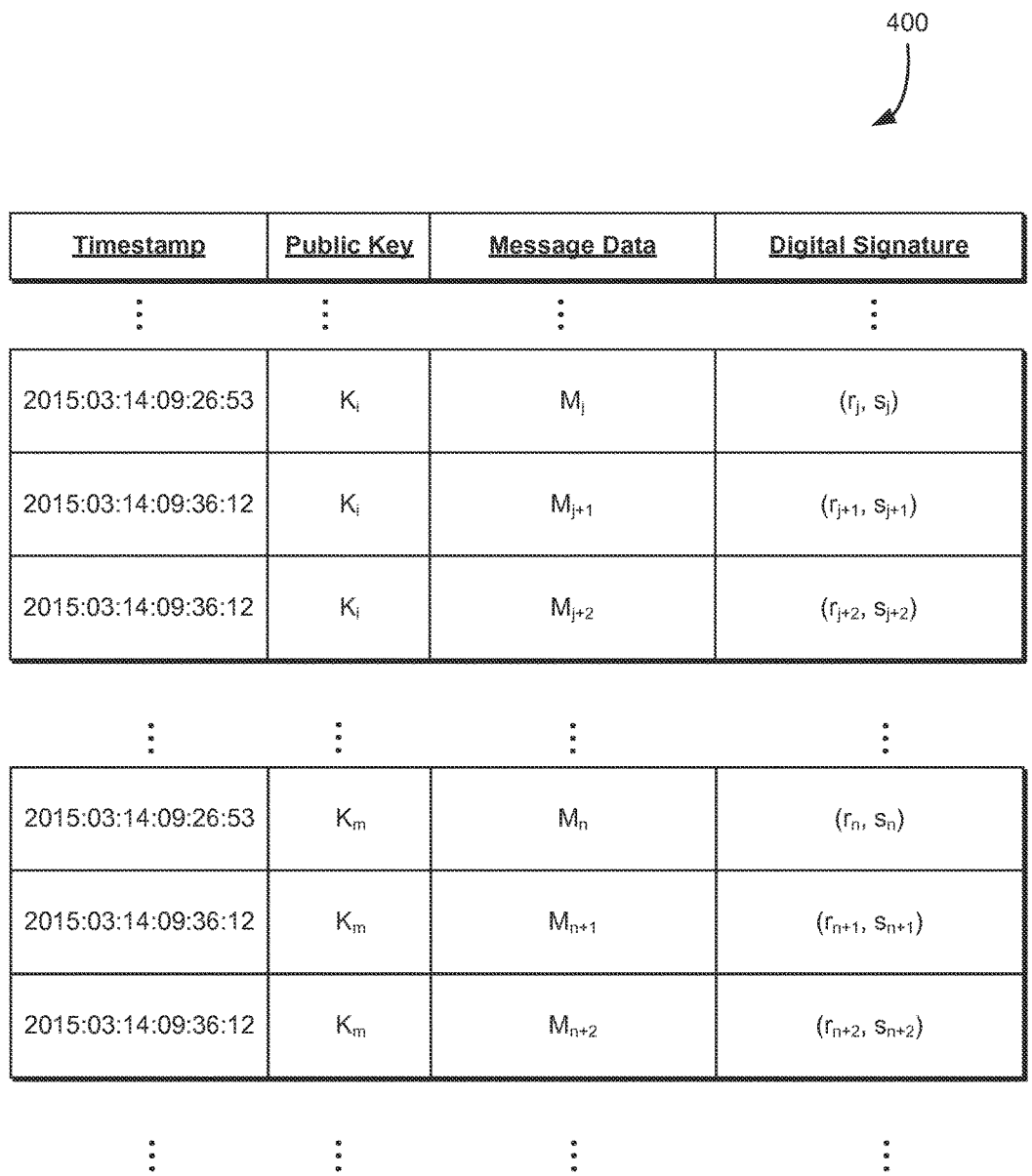
FIG. 4 shows an illustrative example of a data structure used to log use of uniqueness constrained values in accordance with an embodiment.

An example organization of data for such a repository is discussed below in connection with FIG. 4 although other mechanisms, such as Bloom filters, may be used. As illustrated in FIG. 1, server 104 having received the cryptographic message 106 uses the uniqueness repository 112 to determine whether the uniqueness constrained value 110 is in fact unique. As illustrated in FIG. 1, if the server 104 detects that the uniqueness constrained value 110 is not unique, the server 104 may perform one or more security actions, such as preventing exploitation of a vulnerability, detecting the possibility of exploitation of a vulnerability, triggering an alarm (e.g, transmitting a notification), or otherwise limiting the exploitation of a vulnerability. Generally the executable instructions executed by the server 104 may depend on whether the uniqueness constrained value 110 violates any uniqueness constraints. For instance, if the uniqueness constrained value 110 does not violate uniqueness constraints, the server 104 may process the cryptographic message 106 such as by performing a digital signature verification using the digital signature component 108 and uniqueness constrained value 110 in accordance with the particular cryptographic algorithm that was used to generate the digital signature. If the digital signature proves to be valid, the server 104 may then process a message in the cryptographic message 106. The message may be, for example, a request such as a web service request. To process the web service request, the server 104 may fulfill the request and/or perform additional operations such as by determining whether fulfillment of the request is authorized and operating accordingly with whether fulfillment of the request is authorized.

As a result of the server 104 determining that the uniqueness constrained value 110 violates a uniqueness constraint of the cryptographic algorithm being used, the server 104 may perform a security action. The types of security actions that are performed may vary in accordance with various embodiments. In some examples, the server 104 rejects a message in the cryptographic message 106, such as by not fulfilling a request encoded by the cryptographic message 106. The server 104 may determine not to verify the digital signature and thereby cause such a request to go unfulfilled. As another example, a security action may involve transmitting a notification of the violation of the uniqueness constraint to the client 102 and/or one or more other entities, such as an administrative entity associated with the client 102, a certificate authority that issued a digital certificate that cryptographic binds a public/private key pair to an identity associated with the client 102, and/or otherwise. Other actions include blocking communications from an internet protocol (IP) address indicated in the cryptographic message 106 as an originating IP address, performing increased logging of messages from such an IP address and/or messages purporting to be from the client 102, applying a stricter set of network security controls to network traffic from the IP address and/or network traffic otherwise purporting to be from the client 102, and/or other actions. In some examples, (e.g., ECDSA and DSA) use of the same uniqueness constrained value in the same digital signature algorithm with different public/private key pairs can create a security vulnerability (e.g., the ability of one private key holder to calculate the private key of the other). As a result, detection of a violation of a uniqueness constraint for different public cryptographic keys may cause a security action to be performed where the security action may cause both public keys to be revoked. For example, one or more messages may be transmitted to a certificate authority or other entity operable to revoke digital certificates or to otherwise revoke public keys. Note that, when a security action can affect the ability to use a key pair, additional operations may be performed. For example, authentication of a digital certificate or other authentication of a public key may be performed to ensure that a digital signature with a repeated uniqueness constrained value was not maliciously provided (e.g., generated using mathematical properties of ECDSA that allows for binding public keys to digital signatures of arbitrary messages) for the purpose of invalidating a public key of someone else. For instance, some security actions may require first authentication of the public key, such as by verifying that a digital certificate was digitally signed by a trusted certificate authority.

Note that FIG. 1 illustrates a synchronous process whereby the server 104 synchronously, with processing of the cryptographic message 106, determines whether any violations of uniqueness constraints by the uniqueness constrained value 110 have occurred. As discussed in more detail below, checks on violation of uniqueness constraints may be performed asynchronously relative to processing of the cryptographic message 106. For instance, in some embodiments if the uniqueness constrained value 110 violates a uniqueness constraint, detection of the violation may not occur until after the cryptographic message has been processed. For instance, the server 104 may simply process cryptographic messages such as by verifying digital signatures and processing the respective messages accordingly and may log information that enables an asynchronous process to analyze the logs to detect any violations that have occurred. If a violation is detected by the asynchronous process, the security actions may be performed after the cryptographic messages containing the violations have been processed. Other variations are also considered as being within the scope of the present disclosure.

Note also that, while FIG. 1 shows a specific example of a cryptographic message 106, other cryptographic messages are also considered as being within the scope of the present disclosure. For instance, a cryptographic message may be any message generated based at least in part on performance of a cryptographic algorithm and from which information usable to determine whether violation of a uniqueness constraint has occurred. Uniqueness constraints may, for instance, be applied to nonces and other initialization vectors in various cryptographic algorithms, which may be used for digital signature generation and verification, encryption, decryption, and/or other cryptographic operations. For instance, the cryptographic message may be encrypted data with a nonce or other initialization vector used in a cryptographic algorithm for performing encryption/decryption, such as described below.

Figure 2:
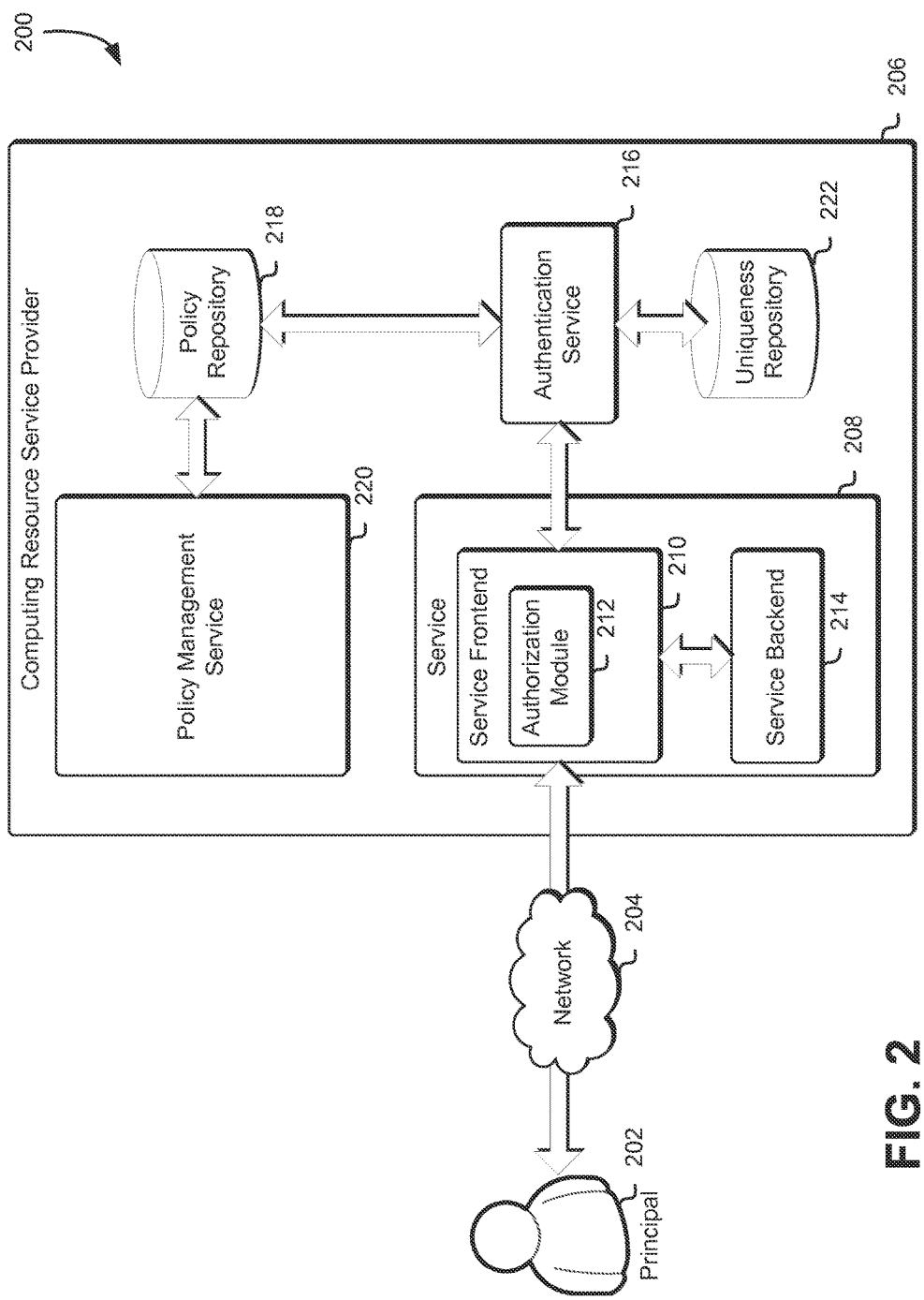
FIG. 2 shows an illustrative example of an environment of a computing resource service provider in accordance with an embodiment.

FIG. 2 is an illustrative example of an environment 200 in which a distributed computer system may utilize the various techniques described herein. In an embodiment, a principal 202 may use a computing device to communicate over a network 204 with a computing resource service provider 206. Communications between the computing resource service provider 206 and the principal 202 may, for instance, be for the purpose of accessing a service 208 operated by the computing resource service provider 206, which may be one of many services operated by the computing resource service provider 206. The service 208 may comprise a service frontend 210 and a service backend 214. The principal 202 may, through an associated computing device, issue a request for access to a service 208 (and/or a request for access to resources associated with the service 208) provided by a computing resource service provider 206. The request may be, for instance, a web service application programming interface request. The principal may be a user, or a group of users, or a role associated with a group of users, or a process representing one or more of these entities that may be running on one or more remote (relative to the computing resource service provider 206) computer systems, or may be some other such computer system entity, user, or process. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity and where the entity may include one or more sub-entities, which themselves may have identities.

The principal 202 may communicate with the computing resource service provider 206 via one or more connections (e.g., transmission control protocol (TCP) connections). The principal 202 may use a computer system client device to connect to the computing resource service provider 206. The client device may include any device that is capable of connecting with a computer system via a network, such as example devices discussed below. The network 204 may include, for example, the Internet or another network or combination of networks discussed below.

The computing resource service provider 206, through the service 208, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the service 208 may be received by a service frontend 210, which, in some examples, comprises a web server configured to receive such requests and to process them according to one or more policies associated with the service 208. The request for access to the service 208 may be a digitally signed request and, as a result, may be provided with a digital signature. In some embodiments, the web server employs techniques described herein synchronously with processing the requests. The service frontend 210 may then send the request and the digital signature for verification to an authentication service 216. The authentication service 216 may be a stand-alone service or may be part of a service provider or other entity. The authentication service 216, in an embodiment, is a computer system configured to perform operations involved in authentication of principals. In some examples, requests submitted to the service frontend 210 are digitally signed by the principal (i.e., by a computing device used by or operating on behalf of the principal) using a symmetric cryptographic key that is shared between the principal 202 and the authentication service 216. The authentication service, therefore, may use a copy of the symmetric cryptographic key to verify digital signatures of requests purported to have been generated by the principal 202.

However, in other embodiments, the authentication service 216 may be configured to utilize asymmetric cryptography for digital signature verification such as, for example, when the principal digitally signs requests using a private cryptographic key. In such embodiments, the authentication service may be configured to trust a certificate authority that digitally signed a certificate of the principal 202 corresponding to the private cryptographic key. Consequently, in some embodiments, the authentication service may use a public cryptographic key specified by the certificate. In some embodiments, the authentication service checks uniqueness of uniqueness constrained values when verifying digital signatures and, in embodiments where such checks are performed synchronously, a response by the authentication service depends on whether a uniqueness constrained value complies with any applicable uniqueness constraints (e.g., with ECDSA, the value is determined to not have been used before with the same key pair for the same domain parameters). The authentication service or another service may also perform such checks asynchronously and, should a violation of a uniqueness check be determined to have occurred, a database or other mechanism may be updated to enable the authentication service to take the violation into account when processing future requests (e.g., by configuring the authentication service to not trust a digital certificate or otherwise not trust the public key of the key pair associated with the violation), even though the request with the violation may have been successfully fulfilled before the violation was detected. Note that, regardless of whether the authentication service checks for violations of uniqueness constraints synchronously or asynchronously, the authentication service (or, generally, any computer system involved in verification of digital signatures or other cryptographic operations involving cryptographic messages) may update the uniqueness repository 222 so that the information it stores remains current. For example, the authentication service may perform any of the processes described below and, as part of performance of such processes, may update the uniqueness repository.

To check whether a uniqueness constrained value (e.g., of a digital signature) violates a uniqueness constraint, the authentication service 216 may access a uniqueness repository 222 such as described above. The uniqueness repository 222 may encode past usage of uniqueness constrained values in a database, one or more Bloom filters and/or other probabilistic data structure (e.g., hash map), combination of database and one or more Bloom filters and/or other probabilistic data structure, or otherwise. A probabilistic data structure, in an embodiment, is a data structure configured such that, when maintained correctly, a query against the data structure (e.g., whether an element is in a set) has a non-zero probability of being incorrect (e.g., due to a hash collision). The uniqueness repository may be a local data storage system of the authentication service 216, may be operated by a separate service of the computing resource service provider (or another provider or other entity), or otherwise. Note that the uniqueness repository may have data for multiple customers of the service provider and, generally, multiple different identities. In this manner, the uniqueness repository can be checked for use of the same uniqueness constrained value with different messages regardless of the public key used. In this manner, the authentication service (or other system utilizing the uniqueness repository) can mitigate against the effects of an attacker that somehow obtains digitally signed messages from multiple entities that happen to have the same uniqueness constrained value and, therefore, is able to calculate both private keys. For example, as discussed below in connection with FIG. 7, in both ECDSA and DSA, repeated use of the same uniqueness constrained value "r" with different public/private key pairs can enable one with access to two digitally signed messages with the same "r" value to calculate the private key using $s=k^{-1}$ $(z+rd_A)$ mod n.

Upon successful authentication of a request, the authentication service 216 may then obtain policies applicable to the request. A policy may be applicable to the request by way of being associated with the principal 202, a resource to be accessed as part of fulfillment of the request, a group in which the principal 202 is a member, a role the principal 202 has assumed, and/or otherwise. To obtain policies applicable to the request, the authentication service 216 may transmit a query to a policy repository 218 managed by a policy management service 220, which may be the policy management service discussed above in connection with FIG. 1. The query to the policy repository 218 may be a request comprising information sufficient to determine a set of policies applicable to the request. The query to the policy repository may, for instance, contain a copy of the request and/or contain parameters based at least in part on information in the request, such as information identifying the principal, the resource, and/or an action (operation to be performed as part of fulfillment of the request).

Having obtained any policies applicable to the request, the authentication service 216 may provide an authentication response and, if applicable, the obtained policies back to the service frontend 210. The authentication response may indicate whether the response was successfully authenticated. The service frontend 210 may then check whether the fulfillment of the request for access to the service 208 would comply with the obtained policies using an authorization module 212. Note that, in some embodiments, a policy may be configured such that, whether fulfillment of a request violates the policy depends on whether a violation of a uniqueness constraint has occurred. For instance, some data may be considered to be less sensitive than other data and requests for the less sensitive data may be fulfilled despite a detected violation of a uniqueness constraint while access to the more sensitive data may require that a uniqueness constraint violation not have occurred in connection with a public key specified to be used in authentication of requests. Similar techniques may be employed for other types of computing resources, such as computing devices, storage locations, collections of data, identities, policies, and the like.

An authorization module 212 may be a process executing on the service frontend that is operable to compare the request to the one or more permissions in the policy to determine whether service may satisfy the request (i.e., whether fulfillment of the request is authorized). For example, the authorization module may compare an API call associated with the request against permitted API calls specified by the policy to determine if the request is allowed. If the authorization module 212 is not able to match the request to a permission specified by the policy, the authorization module 212 may execute one or more default actions such as, for example, providing a message to the service frontend that causes the service frontend to deny the request, and causing the denied request to be logged in the policy management service 220. If the authorization matches the request to one or more permissions specified by the policy, the authorization module 212 may resolve this by selecting the least restrictive response (as defined by the policy) and by informing the service frontend whether the fulfillment of the request is authorized (i.e., complies with applicable policy) based on that selected response. The authorization module 212 may also by select the most restrictive response or may select some other such response and inform the service frontend whether the fulfillment of the request is authorized based on that selected response. Note that, while FIG. 2 shows the authorization module 212 as a component of the service frontend 210, in some embodiments, the authorization module 212 is a separate service provided by the computing resource service provider 206 and the frontend service may communicate with the authorization module 212 over a network.

Finally, if the fulfillment of the request for access to the service 208 complies with the applicable obtained policies, the service frontend 210 may fulfill the request using the service backend 214. A service backend 214 may be a component of the service configured to receive authorized requests from the service frontend 210 and configured to fulfill such requests. The service frontend 210 may, for instance, submit a request to the service backend to cause the service backend 214 to perform one or more operations involved in fulfilling the request. In some examples, the service backend 214 provides data back to the service frontend 210 that the service frontend provides in response to the request from the principal 202. In some embodiments, a response to the principal 202 may be provided from the service frontend 210 indicating whether the request was allowed or denied and, if allowed, one or more results of the request.

Figure 3:
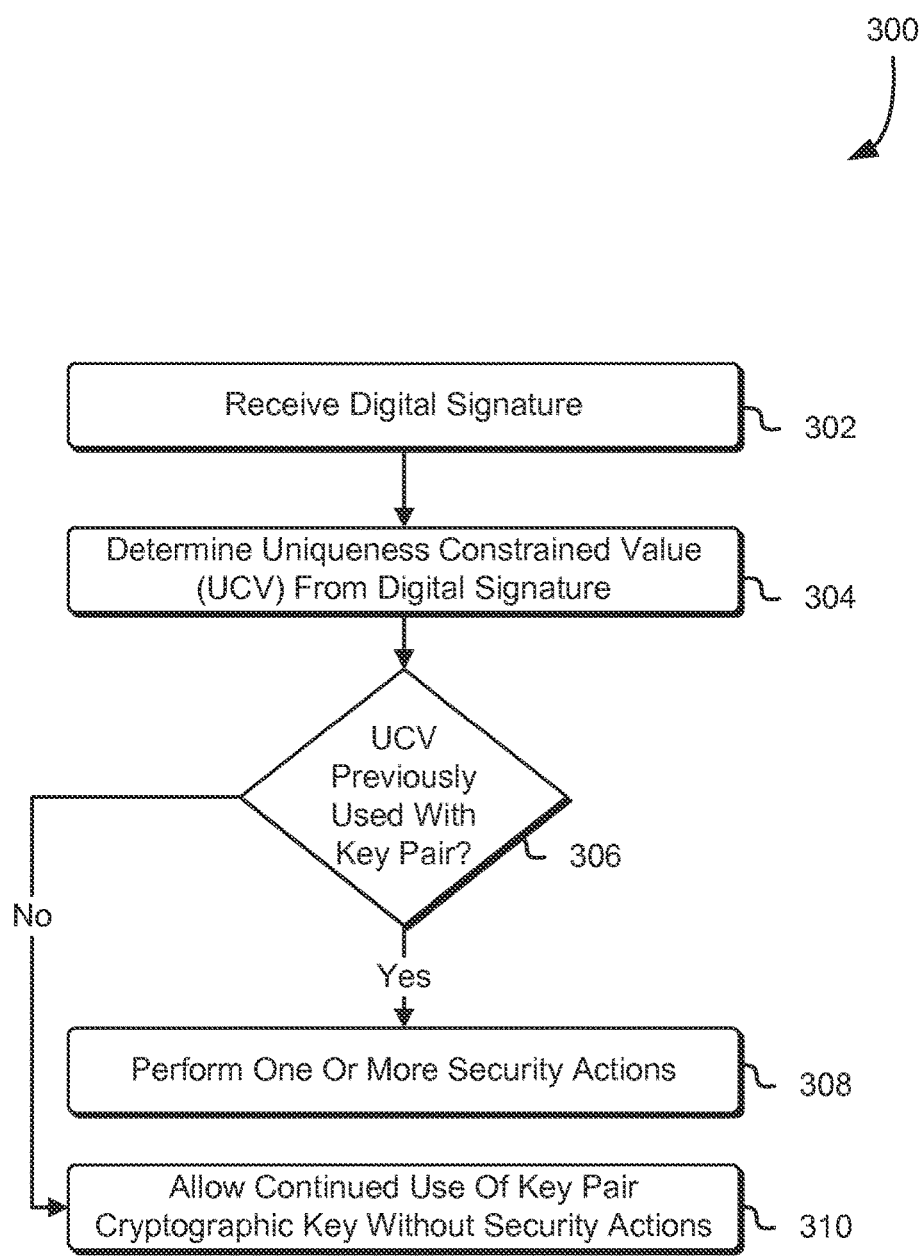
FIG. 3 shows an illustrative example of a process for monitoring use of uniqueness constrained values in accordance with an embodiment.

FIG. 3 shows an illustrative example of a process 300 for monitoring use of uniqueness constrained values in accordance with an embodiment. The process 300 may be performed by any suitable system such as by a web server or an authentication service such as described above. Generally, any computer system with access to information about previous use of uniqueness constrained values may perform the process 300 and variations thereof. In an embodiment, the system performing the process 300 receives 302 a digital signature. The manner by which the digital signature is received may vary in accordance with various embodiments. In some examples, the system performing the process 300 receives the cryptographic message such as described above in connection with FIG. 1. In other examples, the system performing the process 300 obtains the digital signature from a log, such as a log with entries populated by one or more web servers or authentication service servers. In other examples, a network device in the path of communication between a client and server may receive 302 the digital signature as a result of one or more communications (e.g., IP packets) passing from the client to the server. Other examples, while not necessarily discussed explicitly herein, are considered as being within the scope of the present disclosure.

Having received 302 the digital signature, a system performing the process 300 may determine 304 a uniqueness constrained value from the digital signature. In some examples, such as ECDSA and DSA, the digital signature is made of two components: a signature component often denoted by the letter "s" and a uniqueness constrained value often denoted as the letter "r," such as noted above. Having determined 304 the uniqueness constrained value from the digital signature that was received 302, the process 300 may include determining 306 whether the uniqueness constrained value was previously used with the same cryptographic key pair (i.e., whether the system performing the process 300 has recorded previous use of the uniqueness constrained value). The determination 306 may be made in various ways in accordance with various implementations. As an example, a system performing the process 300 may have a copy of the public cryptographic key of the key pair and may use the public cryptographic key to form a query to a database, where the query is configured to return any records having the same public cryptographic key and the same uniqueness constrained value. The query may be formed in various ways in accordance with various embodiments and may be formulated using a syntax suitable for a system processing the query.

As another example, a system performing the process 300 may perform a search of information that stores records corresponding to previous use of uniqueness constrained values where the uniqueness constrained values may be stored in association with respective public cryptographic keys or other information corresponding to public cryptographic keys, such as hashes of public cryptography keys, digital certificates that cryptographically bind public cryptographic keys to their respective private cryptographic keys, and or finger prints of such certificates.

As yet another example, information about previous use of uniqueness constrained values may be encoded in a one or more Bloom filters. In one implementation, when a digital signature is received, for recording and checking, the public key (or a derivation thereof, such as a hash) and the uniqueness constrained value (or derivation thereof) may be canonicalized into information that is checked against and encoded into a Bloom filter. Information that is canonicalized for checking against and entry into the Bloom filter may also include the respective associated with the digital signature, or a derivation thereof, such as a hash of the message or the signature component of the digital signature. In alternate embodiments, multiple Bloom filters are used and cross referenced where all Bloom filters indicating a positive match indicates a violation of a uniqueness constraint. For instance, one Bloom filter may be used for encoding use of public keys, another for encoding use of uniqueness constrained values. In such embodiments, messages and/or derivations thereof may be included with the information encoding use of the public keys entered into the respective Bloom filter, may be included with the information encoding use of the uniqueness constrained values entered into its respective Bloom filter, and/or may be included into a separate Bloom filter.

Timestamps, other sequence numbers, and/or other information may be used to associate results from different Bloom filters with one another. For example, for a digital signature, a timestamp and a public key may be canonicalized into information that is encoded into a first Bloom filter. A uniqueness constrained value and the same timestamp may be canonicalized into information that is encoded into a second Bloom filter. A positive match from both Bloom filters (but not less) may indicate a violation of a uniqueness constraint. Extending this example, the timestamp and the message may be canonicalized and encoded into a third Bloom filter. In this extended example, a positive match of all three (but no less) may indicate violation of a uniqueness constraint with the added assurance that the match was not caused by a repeat of the same communication received twice. Generally, any set of Bloom filters that collectively indicate whether a uniqueness constrained value is in violation of a uniqueness constraint may be used. Further, note that, in these examples, derivations (e.g., hashes) of values mentioned may be used for some or all of the values.

Note that, when a Bloom filter or other probabilistic data structure is used, in some implementations, a determination that a violation of a uniqueness constraint has occurred may be incorrect due to potential for false positives. In some embodiments, the probabilistic data structure is configured such that the probability of a false positive is below a specified threshold to balance the computational efficiency provided by the data structure with the inconvenience caused by security actions that are unnecessarily performed as a result of a false positive. Other techniques to mitigate against false positives, such as by reference to a database only when a violation is potentially detected, may be used such that additional computing resources are used to make sure there was a violation only when the potential of a violation having occurred has been detected.

If the system performing the process 300 determines 306 that the uniqueness constrained value was recorded as previously used with the same public/private key pair, the system may perform 308 one or more security actions such as described above. The security actions that are performed may vary in accordance with various embodiments and in particular with various implementations of a system that performs the process 300. The security actions that are performed may depend, for example, on whether the process 300 is being performed synchronously with processing of messages associated with the digital signature or asynchronously. As noted, for instance, the one or more security actions may include performing one or more operations that limit access to data, performing one or more operations that limit an ability to communicate with a server, transmitting one or more notifications, performing one or more operations that result in maintained, but reduced access to data, and/or other operations.

If the system performing the process 300 determines 306 that the uniqueness constrained value was not recorded as previously used with the same public/private key pair. The system may allow 310 continued use of the key pair without performing the one or more security actions that are performed 308 when determined 306 that the uniqueness constrained value was used with the same key pair. For example, a message associated with the digital signature, that is, a message over which the digital signature was calculated, may be processed. Similarly, validity of the digital signature itself may be verified as a precondition to processing the message. Other examples are also considered as being within the scope of the present disclosure. Note that other operations may also be performed, such as logging use of the uniqueness constrained value. Generally, in all processes described herein, additional operations may also include logging previously-unrecorded use of uniqueness constrained values (e.g., by updating an applicable database and/or Bloom filter) so that the data against which uniqueness constrained values is checked remains current.

Note that variations of the process 300 within the scope of the present disclosure include variations where previous use of a uniqueness constrained value is checked not only for previous use in connection with the same key pair, but other previous uses, such as with different key pairs. For example, use of a uniqueness constrained value by one entity with a first key pair where previous use of the uniqueness constrained value occurred by another entity with a second key pair, different from the first, may cause a security vulnerability for some cryptographic algorithms. Accordingly, the process 300 may include checking for previous use of the same uniqueness constrained value with another public key as well as with the same public key. Other variations of the process 300 within the scope of the present disclosure include variations where previous use of a uniqueness constrained value is checked before a digital signature is generated and/or used. For instance, a system may check uniqueness constrained values as a service and a computing device may transmit a request to the service to verify a uniqueness constrained value before the computing device generates a digital signature and/or transmits the digital signature to another computing device. In this example, security actions may include a response to such a request indicating previous use of the uniqueness constrained value and allowing continued use of the key pair may include a response to the request indicating no detection of previous use of the uniqueness constrained value.

As noted above, FIG. 4 shows an illustrative example of a data structure 400, which may be used to store information about previous use of uniqueness constrained values. In this example, the data structure 400 is in the form of a table, although other mechanisms for organizing data may be used. In an embodiment, the data structure 400 includes four columns. In an embodiment, the data structure 400 includes a timestamp column that indicates when respective digital signatures were received. An entry in the timestamp column may indicate when a digital signature recorded in the same row as the entry was received. Note that various embodiments of the present disclosure may be implemented without a timestamp column.

A public key column of the data structure 400 may have entries corresponding to public keys used to verify respective digital signatures. Entries in the public key column may be populated, for example, using public keys themselves, hashes of the public keys, other information containing the public keys such as digital certificates, fingerprints of digital certificates encoding the public keys, other identifiers associated with the public keys, and/or other information from which a determination can be made whether a uniqueness constrained value was used with a particular public key.

A message data column in the data structure 400 may contain data that is based at least in part on messages over which respective digital signatures were generated. The message data column 400 may contain, for example, the messages themselves. As another example, entries in the message data column may contain hashes of the respective messages. Other identifiers of messages may also be used.

A digital signature column of the data structure 400 may include the digital signatures that were received by a system that maintains the data structure 400. As noted above, in some cryptographic algorithms, digital signatures are comprised of two components, a uniqueness constrained value and a signature component. Note that the components of a digital signature may be stored in different columns and that in some embodiments the uniqueness constrained value is stored without the signature component to save space. Looking at an example row in the data structure 400, the first data-containing row illustrated in the figure indicates that a message $M_j$ was received on Mar. 14, 2015 at 09:26:53, that the message $M_j$ was received with a digital signature $(r_j, s_j)$, and that a public key $K_i$ was used to verify the digital signature.

In this manner, when a digital signature to be verified using a public key is received, the public key with which the digital signature is to be verified and the uniqueness constrained value of that digital signature may be used to query against the data structure 400 to determine whether any entries indicate use of the same cryptographic public key with the same uniqueness constrained value. Entries in the message data column may be used to determine whether any identified uses of the same uniqueness constrained value with the same public cryptographic key were used with the same message. For instance, with some cryptographic algorithms use of the same key pair with the same uniqueness constrained value for the same message data may not be a security breach because repeated use of the same inputs into the cryptographic algorithm simply result in multiple copies of the same result. Note that the signature component of the digital signature may be used in the same manner since use of the same uniqueness constrained value with the same public/private key pair and the same message will result in the same signature component of the digital signature. Thus in some embodiments, data structures lack the message data and utilize the signature component of digital signatures for that purpose. Similarly, in some implementations, data structures recording past usage of uniqueness constrained values utilize message data without storing the signature component of the digital signatures.

Note that the public key column can be used in other ways as well. For example, as noted, repeated use of a uniqueness constrained value with different public/private key pairs can create a vulnerability in some cryptographic algorithms, even when such use is by completely different entities (e.g., different customers of a service provider). Accordingly, in some examples, the public key column can be used to determine which public keys are affected by repeated use of a uniqueness constrained value. For example, the data structure 400 or a variation thereof may be indexed by the "r" values (uniqueness constrained values). Checking for repeated use of a uniqueness constrained value may be performed by searching for the same uniqueness constrained value in the data structure and, if found, ensuring that the digital signature (or digital signature component of the digital signature) is different. Using ECDSA, as an example, if a collision in a hash table is found, a security action may be performed if the public keys are different or if the messages are different.

Other variations are also considered as being within the scope of the present disclosure, including variations where timestamps are not included, where data is organized into different matters, such as with different orderings of columns, different mechanisms for storing data, and the like. Further, a data structure may implement one or more Bloom filters. As an example, a data structure may include a row for each public key whose use has been recorded. An entry in the row may be a Bloom filter to determine if the same uniqueness constrained value was used for the same message.

In various embodiments, the actual data that is stored to record past use of uniqueness constrained value may vary. In some examples, referring to FIG. 4, data that is used to record prior use of uniqueness constrained values may lack message data and a signature component of a digital signature. In such embodiments, determinations may be made simply whether the same uniqueness value was ever used with the same cryptographic key. In such implementations, depending on how implemented receipt of the same communication twice may inadvertently trigger the performance of one or more security actions such as when a system is not configured to ignore multiple copies of the same communications.

Figure 5:
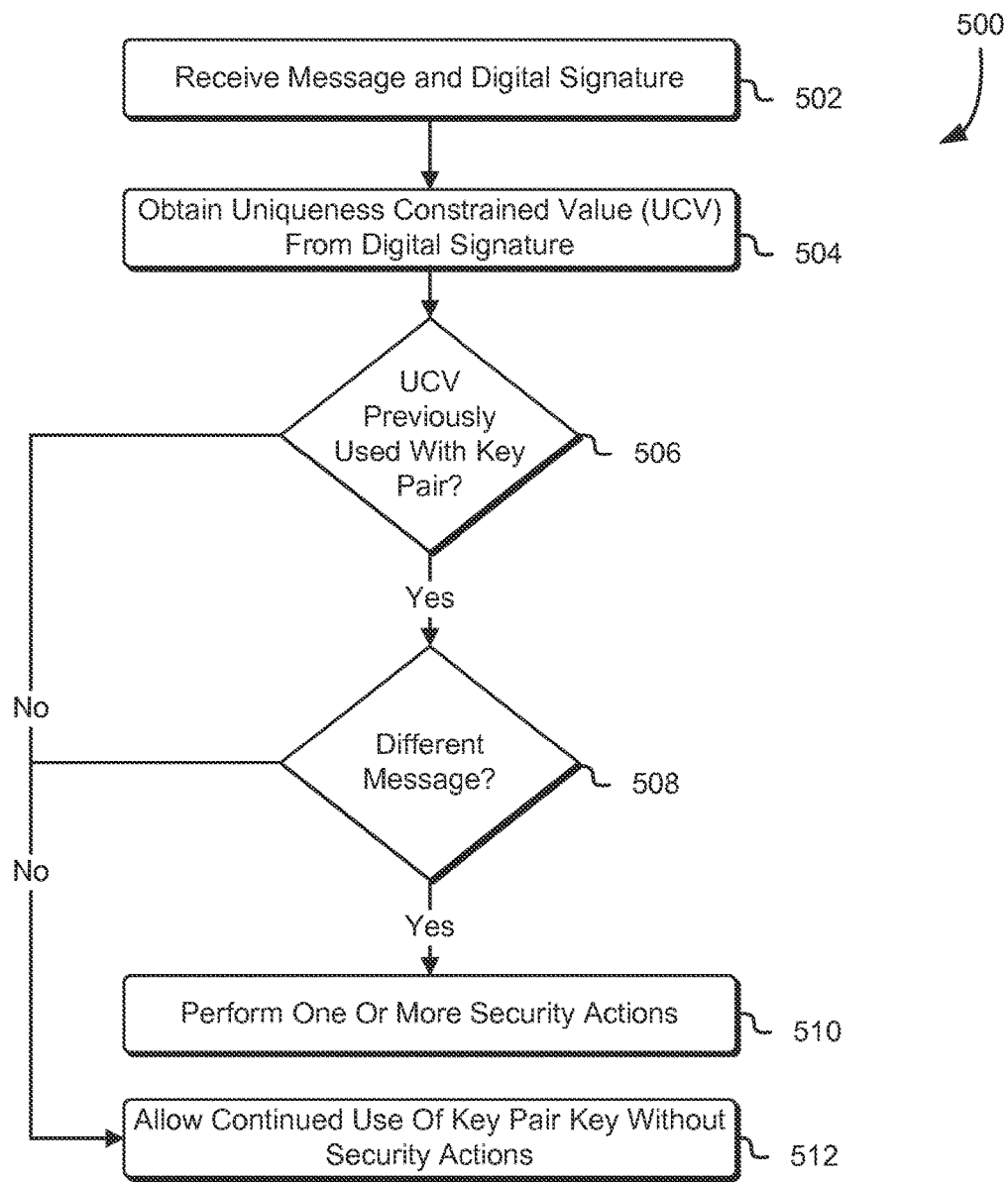
FIG. 5 shows an illustrative example of a process for monitoring uniqueness constrained values in accordance with an embodiment.

As noted, more complicated techniques may be utilized to prevent false positives when determining whether there has been previous use of uniqueness constrained values with the same cryptographic key pair. FIG. 5 accordingly shows an illustrative example of a process 500 that may be used to monitor previous use of uniqueness constrained values. In an embodiment, the process 500 includes receiving 502 a message and a digital signature, such as described above. As noted, the message and digital signature may be received 502 by a server configured to process the message and/or en route to such a server. In other examples, the message and digital signature are received 502 in an asynchronous process such as an analysis of logs emitted by such a server. Note that in such asynchronous processes and in general to all processes, the process 500 may be modified such that the message itself is not received but information based at least in part on the message is received, such as a hash of the message or another identifier of the message.

Returning to the embodiment illustrated in FIG. 5, in this example, the process 500 includes obtaining 504 a uniqueness constrained value from the digital signature that was received 502. For instance, with ECDSA and DSA, the digital signature may include two components: a uniqueness constrained value and a signature component; and, the uniqueness constrained value may be obtained 504 by parsing the digital signature to determine the uniqueness constrained value. The system performing the process 500 may determine 506 whether the uniqueness constrained value was recorded as previously used with the same public/private key pair. As noted above, a public cryptographic key used or to be used to verify the digital signature may be used to perform a lookup in a data structure such as described above or to query a database where such information is stored.

If any records indicate previous use of the same uniqueness constrained value with the same key pair, the process 500 may include determining 508 whether such previous use was with a different message. As noted, messages themselves may be compared, hashes of the messages may be compared, or a previously received signature component of a digital signature may be compared with the signature component of the digital signature that was received 502 by the system performing the process 500. Generally, any way by which a record indicating previous use of uniqueness constrained value was used with the same message that was received 502 may be used.

If determined 508 that the previous use of the uniqueness constrained value was with a different message, the process 500 may include performing 510 one or more security actions such as described above. If a system performing the process 500 determines 506 that the uniqueness constrained value was not recorded as previously used with the same key pair and/or if the system determines 508 that any previous use of the uniqueness constrained value with the same key pair was not with a different message (i.e., was with the same message), the process 500 may include allowing 512 continued use of the key pair without performance of the one or more security actions that are performed 510 as a result of the uniqueness constrained value having been previously used with the same key pair but a different message.

Figure 6:
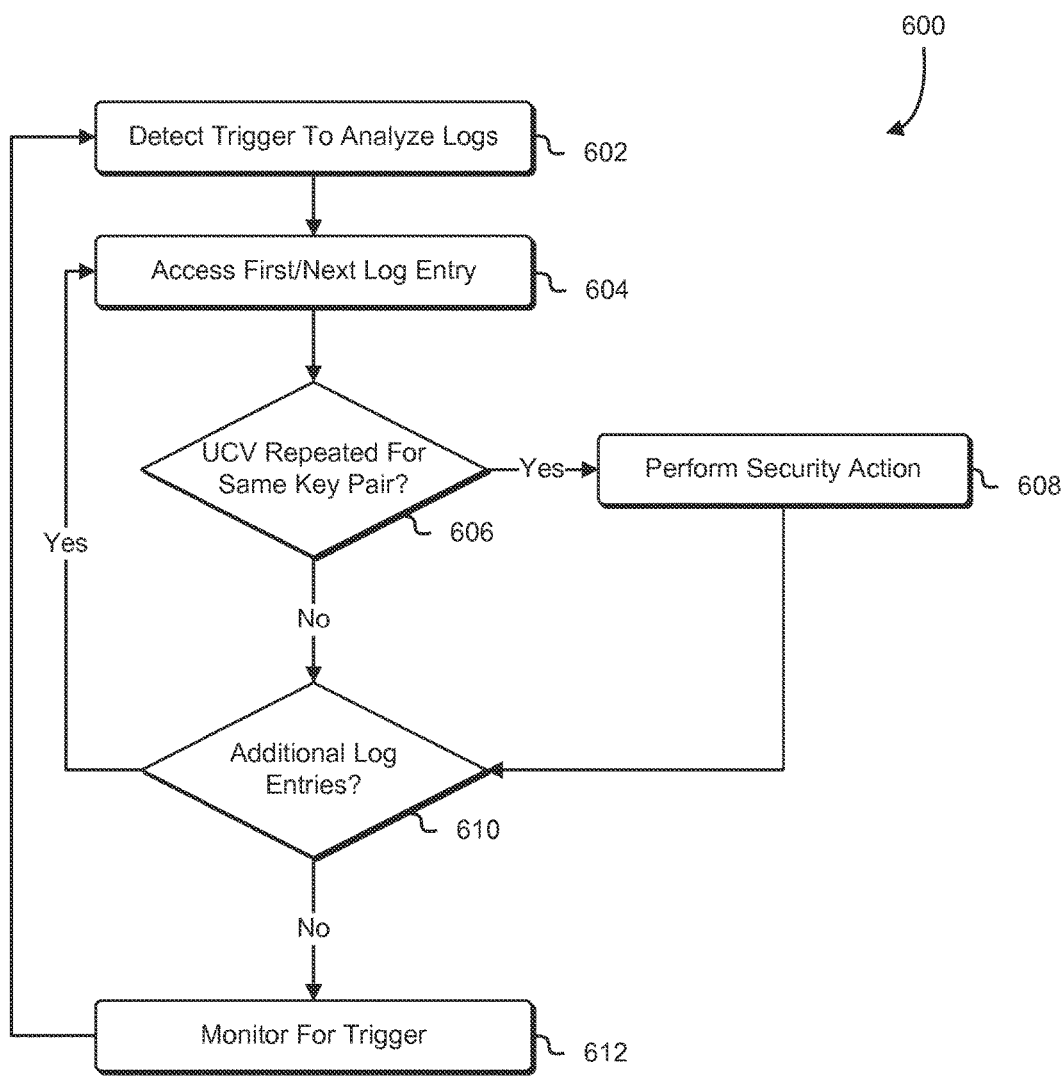
FIG. 6 shows an illustrative example of a process for analyzing logs to monitor use of uniqueness constrained values in accordance with an embodiment.

As noted above, systems that utilize digital signatures to authenticate messages may store information used in their operations in logs which may be asynchronously processed in various embodiments. FIG. 6 shows an illustrative example of a process 600 for analyzing logs in accordance with an embodiment. The process 600 may be performed by any suitable computer system such as a computer system in a distributed system such as described above in connection with FIG. 2 that has access to a uniqueness repository which may store data such as described above in connection with FIG. 4 and which is configured to perform the various operations of the process 600 and variations thereof.

In an embodiment, a process performing the process 600 detects 602 a trigger to analyze logs. The trigger may be, for example, a clock of a system performing the process 600 reaching a specified time. As an illustrative example, a system performing the process 600 may be programmed to obtain and analyze logs on a periodic schedule such as once a day. Accordingly, the trigger may be the clock of the system reaching a time on the system's schedule for processing logs. Other triggers may be, for example, the size of a log such as a number of records that have yet to be processed for determining whether use of uniqueness constrained values has resulted in any violations. As yet another example, a computer system performing the process 600 may receive a command to perform the process 600 and the trigger may be receipt of the command and/or related operations such as determining that the command is both authentic and authorized. Other triggers may also be used in accordance with different embodiments.

To analyze the logs in an embodiment, the process 600 includes accessing 604 the first log entry. The first log entry may be analyzed to determine 606 whether the uniqueness constrained value was repeated for the same key pair. The log entry may be used, for example, to form a query that may be executed against a data structure such as described above in connection with FIG. 4 to compare use of the uniqueness constrained value in the log entry with any previous usage of uniqueness constrained values with the same key pair. If determined 606 that the uniqueness constrained value was repeated for the same key pair, the process 600 may include performing 608 a security action such as described above. The security action may be an action as described above or may include other actions which will in turn cause additional actions to occur. For example, violation may be recorded for further processing. As another example, a security action may be added to a queue of security actions that is processed during and/or after performance of the process 600. Note that the determination 606 whether the uniqueness constrained value of the log entry was repeated for the same key pair may include additional determinations such as described above. For example, the determination 606 may also include a determination of whether the message in the log entry was the same as a previously received message such as described above in connection with FIG. 5. In other words, the security actions may be performing one or more operations that cause another security action to occur.

Having performed 608, the security action, or having determined 606 that the uniqueness constrained value was not repeated for the same key pair, the process 600 may include determining 610 whether there are additional log entries to process. If determined 610 that there are no additional log entries to process, the process 600 may include accessing 604 the next log entry and the process 600 may continue as illustrated in the figure until it is determined 610 that there are no additional log entries to process. Once determined 610 that there are no additional log entries to process, the process 600 may include monitoring 612 for the trigger. Monitoring 612 may continue if and until the trigger to analyze the logs is detected such as described above.

Variations of the process 600 include variations where a log is not used, but servers that receive digital signatures place the digital signatures and related data (e.g., as discussed above in connection with FIG. 4) into a queue. The operations discussed in FIG. 6 may be performed by accessing items in the queue whenever there are one or more items in the queue to process. In this example, a system may monitor the queue and process items in the queue as resources permit.

Figure 7:
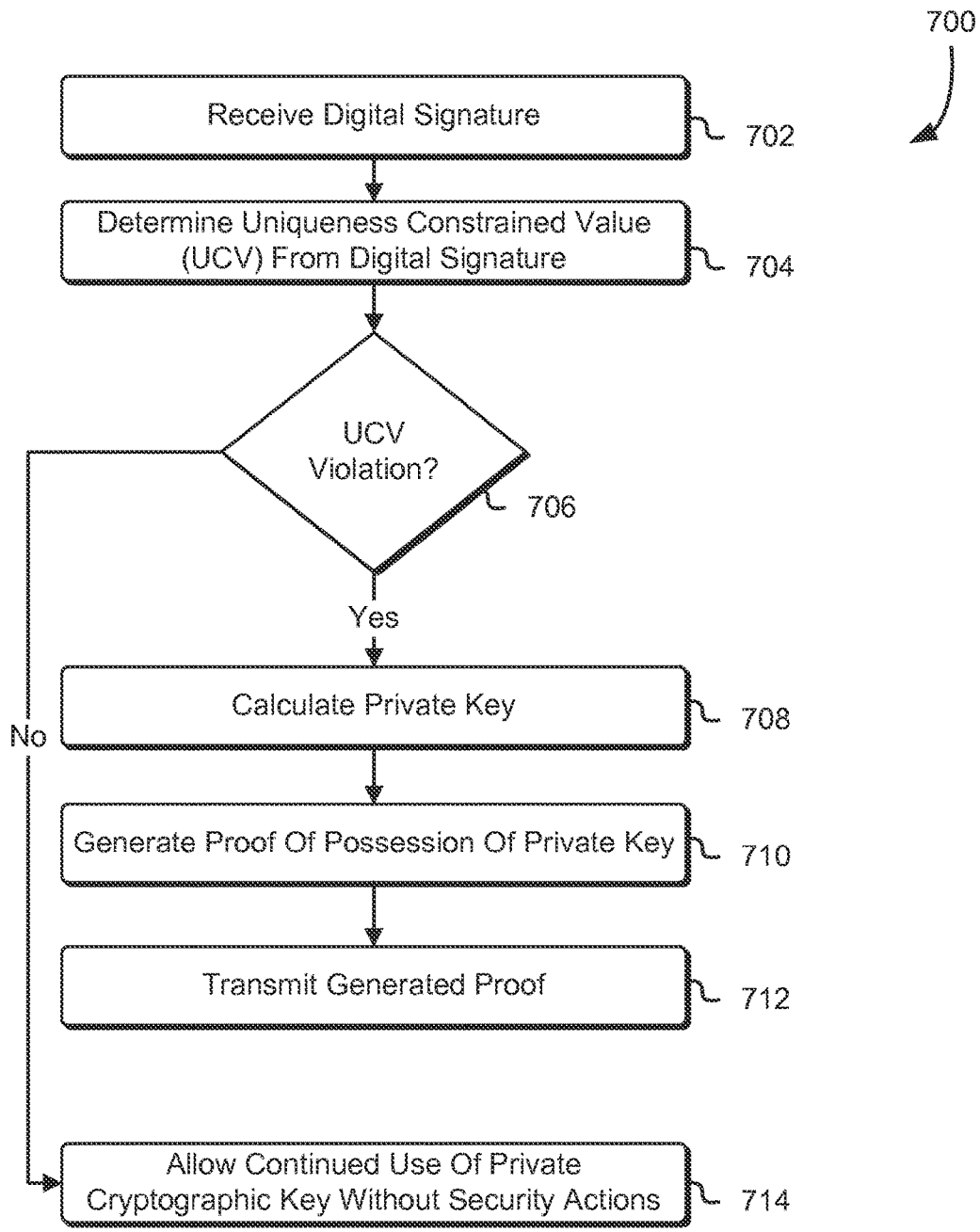
FIG. 7 shows an illustrative example of a process for monitoring uniqueness constrained values and transmitting a notification when a violation of a uniqueness constraint has been violated in accordance with an embodiment.

FIG. 7 shows an illustrative example of a process 700 for monitoring network traffic for uniqueness constrained value violations that utilize a security vulnerability to prevent future exploitation of the security vulnerability. The process 700 may be performed by any suitable system such as a web server or another computer system able to access a uniqueness repository. In an embodiment, the process 700 includes receiving 702 a digital signature and determining 704 a uniqueness constrained value from the digital signature such as described above. A determination may be made 706 whether there is a uniqueness constrained value violation as noted above. For some cryptographic algorithms, a uniqueness constrained value violation results in an ability to calculate a private key of a key pair without the need for extraordinary computational effort. For example, in ECDSA, use of the same uniqueness constrained value for two different digital signatures allows for use of the equation $s = k^{-1} (z + rd_A) \mod n$ to determine the private key, where "k" and "r" are as discussed above, $d_A$ is the private key and z is the leftmost bits of a cryptographic hash of the message, where the number of leftmost bits is the bit length of the group order n. For example, the above equation with two messages/signatures may be used to solve for "k," and then obtain the private key. A similar technique may be used to calculate the private key using DSA.

Accordingly, in an embodiment, the process 700 includes calculating 708 the private cryptographic key when determined 706 that there has been a uniqueness constrained value violation. Note that in embodiments that involve performance of the process 700 and variations thereof, additional data may need to be stored in the uniqueness repository to enable calculation of the private cryptographic key. For example, the message itself or enough of the cryptographic hash of the message to determine z, as above, may be stored.

Once the private cryptographic key has been calculated 708, the process 700 may include generating 710 proof of possession of the private cryptographic key. Proof of possession of the private cryptographic key may be generated in various ways in accordance with various embodiments. In some instances, the proof of possession is the private cryptographic key itself. In other examples, the proof of possession of the private cryptographic key is a hash or other value derived from the private cryptographic key. In other examples, the proof of possession of the private cryptographic key is a digital signature generated using the private cryptographic key as input into a cryptographic algorithm. As an example, a message indicating the violation may be digitally signed using the private cryptographic key. As another example, a message indicating that the private cryptographic key should be revoked may be generated and digitally signed using the private cryptographic key. Once the proof of possession of the private cryptographic key has been generated, the generated proof may be transmitted 712 to a destination or a plurality of destinations, such as in a broadcast message. In some examples, the destination is an IP address associated with the digital signature that was received 702, such as an IP address from which a cryptographic message containing the digital signature was indicated as having been received. In this manner, such a system may be configured to detect receipt of generated proof, verify the digital signature using its own copy of the private cryptographic key, and may perform one or more actions accordingly, such as by performing one or more operations that cause the computer system to prevent further use of the cryptographic key.

As another illustrative example, the generated proof may be a message indicating that the public cryptographic key has been compromised. For instance, a notification that a digital certificate containing the public cryptographic key may be digitally signed using the private cryptographic key and the generated proof and the digital signature may be transmitted to a certificate authority or other entity configured to track revocations of digital certificates thereby enabling other computer systems to rely on the revocation in determining whether to trust the digital certificate. Other variations are also considered as being with scope of the present disclosure.

In some examples, variations of the process 700 include those where the process 700 and variations thereof are performed by the same computing device that generates the digital signature or in a local network of a device that generates the digital signature. In one variation, an application executing on the computing device that generates and transmits the digital signature (e.g., in a communication addressed to another computer system at a different network address) intercepts the digital signature and synchronously or asynchronously verifies whether any uniqueness constraints have been violated (e.g., by utilizing a Bloom filter or hash table). In the synchronous example, the application may, as a result of detecting a violation of a uniqueness constraint, compute the private key, use a cryptographically secure pseudo random number generator (e.g., in a trusted platform module (TPM) of the computing device or other pseudorandom number generator to generate a new uniqueness constrained value. The new uniqueness constraint value may be checked again for violation of the uniqueness constraint(s) and, if it does not violate a uniqueness constraint, the application may calculate the private key, and use the private key and new uniqueness constrained value to generate a new digital signature and transmit the message with which the original digital signature was calculated with the new digital signature, thereby preventing any information usable to exploit a security vulnerability by repeated use of a uniqueness constrained value from leaving the computer system (or local network, if done by another computer system executing the application). In this example, the computer system may generate and check new uniqueness constrained values until one satisfies all applicable uniqueness constraints and then generate and transmit a new digital signature.

In an asynchronous example, the application may asynchronously verify digital signatures that it accepts (allowing them to pass to their destination) and, if a violation of a uniqueness constrained value is detected, the application may calculate the private key corresponding to the applicable public key and use the calculated private key to re-digitally sign messages that it intercepts after detection of the violation. The application may calculate a new uniqueness constrained value that satisfies applicable uniqueness constraints for each replacement digital signature. Note that, when an application is discussed as performing an operation, the operation is performed by a computing device with one or more processors that execute instructions of the application. Note further that such functionality and, generally any functionality described herein, may be implemented at least partially in hardware circuitry to provide faster processing. In addition, for the protection of privacy, a system performing the operations described herein may store hashes of messages and other applicable information in place of the information itself. For example, the system may store a hash table with an entry for a hash of the public key, an entry for the respective message, and an entry for a hash of the uniqueness constrained value.

Figure 8:
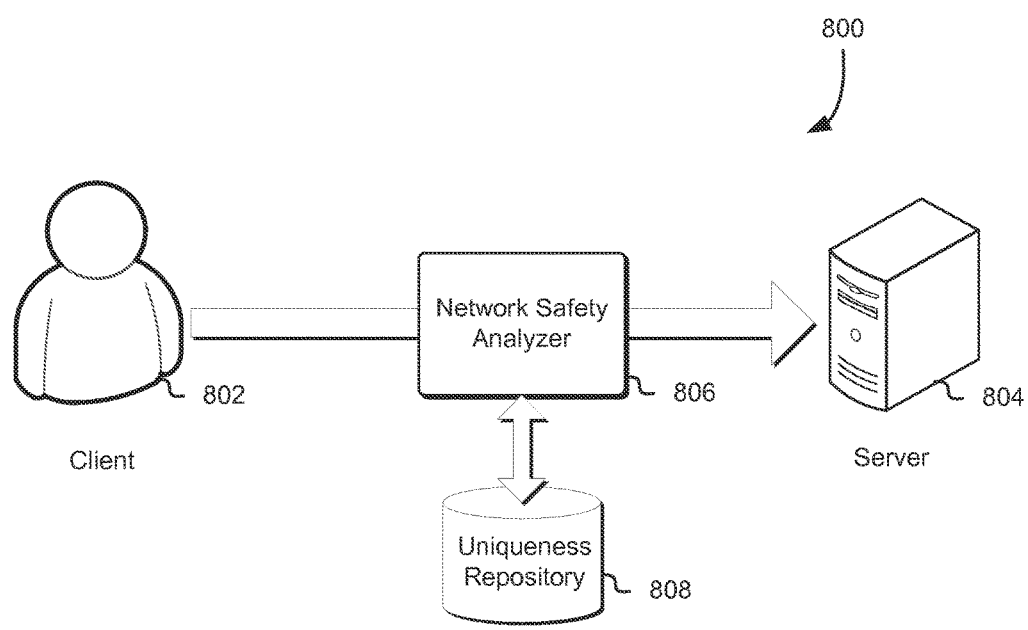
FIG. 8 shows an illustrative example of an environment in which network traffic is monitored to ensure the security of communications traveling over a network in accordance with an embodiment.

FIG. 8 shows an illustrative example of an environment 800 in which various embodiments can be practiced. In the environment 800, a client 802 communicates with a server 804 through a client device such as described above. In this particular example, in the environment 800, a network safety analyzer 806 is positioned in a network such that communications from the client 802 to the server 804 are received by the network safety analyzer 806. The network safety analyzer 806 may be a computer system configured with hardware and/or software to perform various operations such as processes described above.

As illustrated in FIG. 8, the network safety analyzer 806 may have access to a uniqueness repository 808, such as a database, Bloom filter, database that has Bloom filters as entries, and/or a collection of Bloom filters. The network safety analyzer 806 may be configured to analyze network traffic from the client 802 to the server 804. For example, the network safety analyzer 806 may analyze data packets from the client 802 to the server 804 for indications of communications involving digital signatures, such as communications in a handshake of a cryptographically protected communications protocol (such as Secure Shell (SSH), Secure Sockets Layer (SSL), and Transport Layer Security (TLS)) and may perform processes such as described above.

In some embodiments, the network safety analyzer 806 analyzes network traffic synchronously and is configured to perform security actions, such as preventing network traffic from the client 802 from reaching the server 804 when determined that a uniqueness constrained value violation has occurred. In other examples, the network safety analyzer 806 logs network traffic and analyzes the logged network traffic in an asynchronous process, such as by queuing applicable network traffic for processing by an asynchronous process that processes items in the queue. The network safety analyzer 806 may perform various security actions upon detection of uniqueness constrained value violations such as described above.

The above disclosure discusses example cryptographic algorithms, including cryptographic algorithms for digital signatures. A computer system may be configured (e.g., with software and/or hardware (e.g., a crypto-processor) for performing other cryptographic algorithms, some of which have associated uniqueness constraints. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list. As noted, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, Galois/Counter (GCM) mode.

Figure 9:
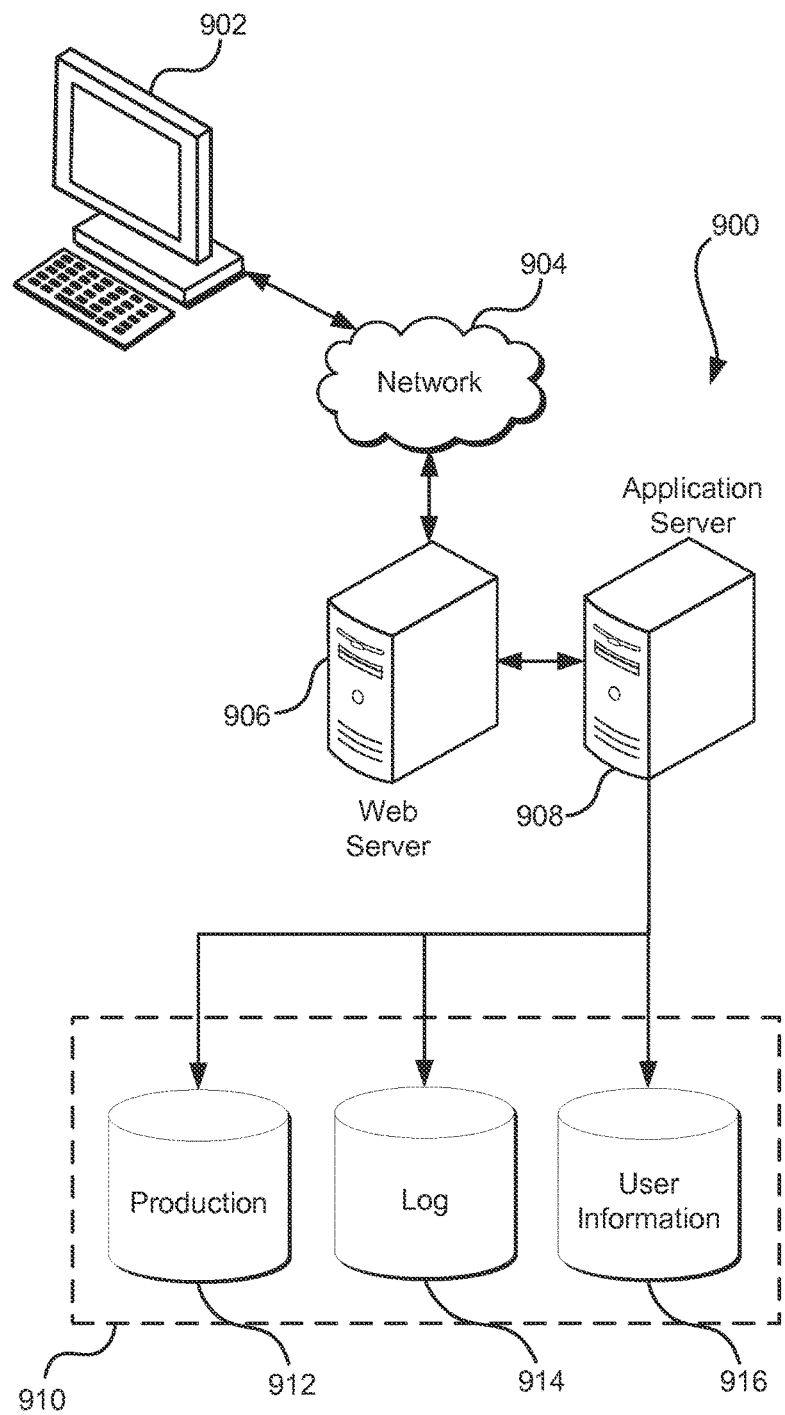
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:
1. A computer-implemented method, comprising:
under the control of one or more computer systems configured with executable instructions,
receiving a message and a digital signature, the digital signature comprising multiple components comprising a component subject to a uniqueness constraint of a specification of a cryptographic algorithm for generating and verifying digital signatures, wherein performance of the algorithm depends on a set of values for a set of parameters for performing the cryptographic algorithm;

using information generated based at least in part on previously received digital signatures to determine whether the component of the digital signature subject to the uniqueness constraint satisfies the uniqueness constraint, wherein the component of the digital signature fails to satisfy the uniqueness constraint as a result of the information generated based at least in part on previously received digital signatures indicates that a value in the component was previously used with the same set of parameters; and as a result of determining that the component of the digital signature subject to the uniqueness constraint fails to satisfy the uniqueness constraint, performing one or more security actions that prevents exploitation of a vulnerability caused by violation of the uniqueness constraint.

2. The computer-implemented method of claim 1, wherein:

the cryptographic algorithm is an elliptic curve digital signature algorithm;

the set of parameters include domain parameters for the elliptic curve digital signature algorithm; and the uniqueness constraint is avoidance of repetition of the same value with the same public/private key pair and for the same domain parameters.

3. The computer-implemented method of claim 1, wherein the set of parameters comprises a cryptographic key.

4. The computer-implemented method of claim 1, wherein:

the message encodes a request; and the one or more security actions includes at least one action that results in the request being unfulfilled.

5. The computer-implemented method of claim 1, wherein:

using the information generated based at least in part on the previously-received digital signatures to determine whether the component of the digital signature satisfies the uniqueness constraint includes using a Bloom filter constructed based at least in part on the previously received digital signatures.

6. A system, comprising:

a set of computing devices, the set of computing devices configured to:

for a digital signature, determine a uniqueness constrained value that is based at least in part on the digital signature, the uniqueness constrained value being constrained according to a specification of a cryptographic algorithm that depends on a set of values for a set of parameters for performing the cryptographic algorithm;

check for previous use of the determined uniqueness constrained value in a previously received digital signature with the same set of parameters for performing the cryptographic algorithm; and if the determined uniqueness constrained value is determined to have been previously recorded as used in the cryptographic algorithm with the same set of parameters for performing the cryptographic algorithm, perform an action that the system is configured to not perform if determined that the uniqueness constrained value is not determined to have been recorded as previously used, the action related to limiting exploitation of a vulnerability caused by the previous use of the determined uniqueness constrained value.

7. The system of claim 6, wherein the set of computing devices is configured to determine the uniqueness constrained value based at least in part on a log constructed based at least in part on previously received digital signatures.

8. The system of claim 6, wherein:

the digital signature is received, by the system, with a message that encodes a request;

the set of computing devices determines the uniqueness constrained value, checks for previous use of the determined uniqueness constrained value prior to completion of processing, by the system, of the request; and the action results in the request not being fulfilled.

9. The system of claim 6, wherein the uniqueness constrained value is derived from a randomly-selected value used for generation of the digital signature.

10. The system of claim 6, wherein the action includes calculation of a private key corresponding to a public key usable to verify the digital signature.

11. The system of claim 10, wherein the set of computing devices is further configured to use the digital signature to digitally sign a message indicating revocation of the public key and transmit the digitally signed message over a network.

12. The system of claim 6, wherein:

the digital signature is verifiable with a public key of a public-private key pair;

the digital signature is of a message; and the set of computing devices checks for previous use of the uniqueness constrained value in connection with the same public key but a different message.

13. The system of claim 6, wherein the set of computing devices checks for uniqueness of the determined uniqueness constrained value using a database comprising a plurality of individual records each generated based at least in part on a respective previously received digital signature.

14. The system of claim 6, wherein the action includes prevention of the exploitation.

15. The system of claim 6, wherein the cryptographic algorithm is an elliptic curve digital signature algorithm.

16. A non-transitory computer-readable storage medium having stored thereon executable instructions that, when executed by one or more processors of a computer system, cause the computer system to at least:

receive information based at least in part on a cryptographic message;

determine, based at least in part on the received information, a uniqueness constrained value that, according to a specification of a cryptographic algorithm whose performance depends on a set of values for a set of parameters for performing the cryptographic algorithm, is subject to a uniqueness constraint;

determine whether the uniqueness constrained value satisfies the uniqueness constraint, wherein the uniqueness constrained value fails to satisfy the uniqueness constraint as a result of being previously used for a previous digital signature with the same set of parameters for performing the cryptographic algorithm;

operate in a first manner if determined that the uniqueness constrained value satisfies the uniqueness constraint; and operate in a second manner, different from the first manner, if not determined that the uniqueness constrained value satisfies the uniqueness constraint, the second manner at least limiting exploitation of a potential vulnerability caused by the uniqueness constraint being unsatisfied.

17. The non-transitory computer-readable storage medium of claim 16, wherein the instructions further comprise instructions that, when executed by the one or more processors, cause the computer system to determining whether the uniqueness constrained value satisfies the uniqueness constraint using a probabilistic data structure.

18. The non-transitory computer-readable storage medium of claim 16, wherein the cryptographic message comprises a digital signature from which the uniqueness constrained value is determined.

19. The non-transitory computer-readable storage medium of claim 16, wherein the cryptographic algorithm utilizes multiplication over a finite field defined by an elliptic curve.

20. The non-transitory computer-readable storage medium of claim 16, wherein the cryptographic algorithm is an elliptic curve digital signature algorithm.

21. The non-transitory computer-readable storage medium of claim 16, wherein:
   the cryptographic message is associated with a public key; and
   operation in the second manner includes causing a set of computer systems to distrust the public key.

22. The non-transitory computer-readable storage medium of claim 16, wherein:
   the cryptographic message is associated with a public key and a private key; and
   operation in the second manner includes generating cryptographic proof of access to the private key and providing the generated cryptographic proof to another entity.

23. The non-transitory computer-readable storage medium of claim 22, wherein the cryptographic proof comprises a digital signature of a message configured to cause revocation of the public key.

24. The non-transitory computer-readable storage medium of claim 16, wherein:
   the cryptographic message is verifiable based at least in part on a first public key; and
   the instructions that cause the computer system to check for previous use of the determined uniqueness constrained value, when executed by the one or more processors, cause the computer system to determine at least whether the determined uniqueness constrained value was recorded as previously used for another cryptographic message that is verifiable based at least in part on another public key different from the first public key.

* * * * *